Figure 1:
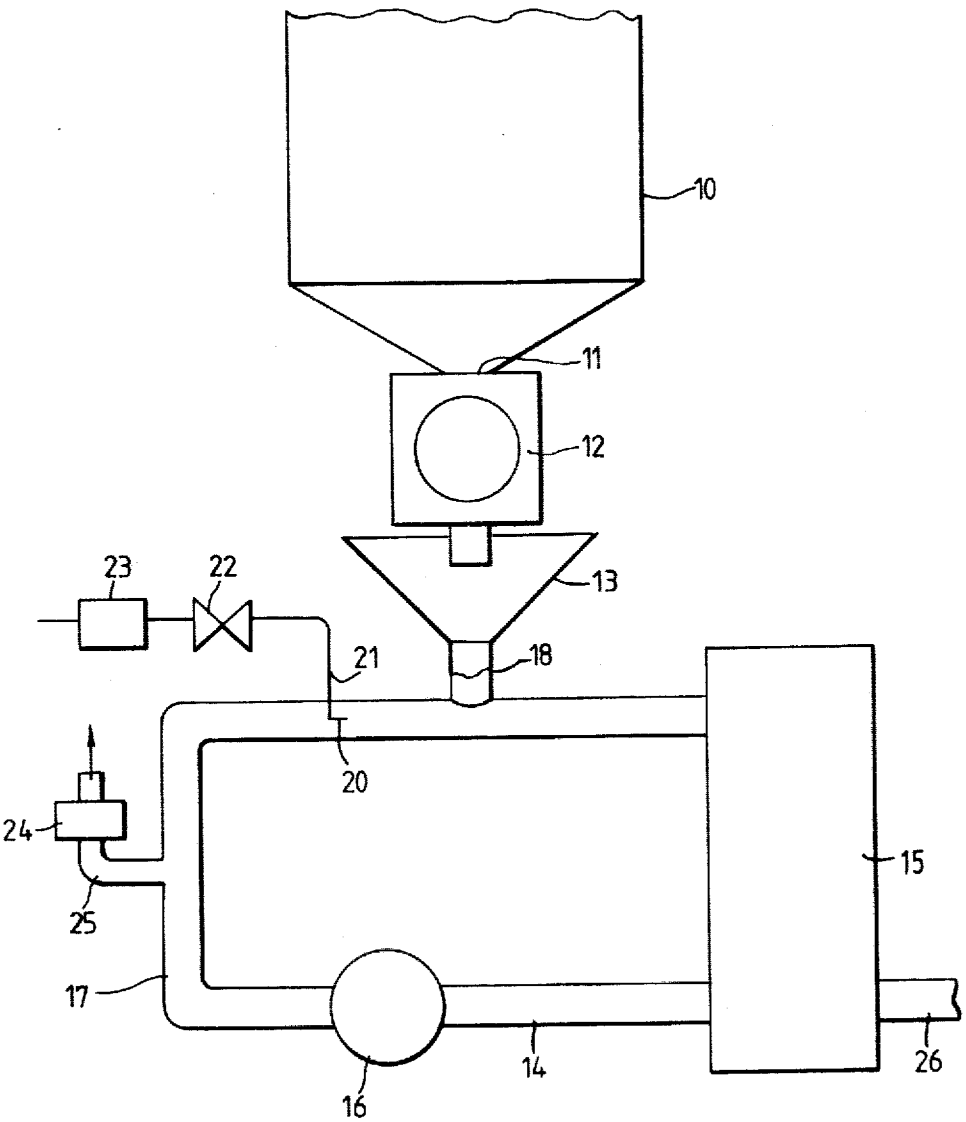

United States Patent [19]

Millis

[11] 4,327,759

[45] May 4, 1982

[54] SLURRY PRODUCING APPARATUS

[75] Inventor: Andrew D. Millis, Hampton, England

[73] Assignee: Wimpey Laboratories Limited, London, England

[21] Appl. No.: 178,020

[22] Filed: Aug. 14, 1980

[30] Foreign Application Priority Data

Aug. 24, 1979 [GB] United Kingdom .............. 29559/79

[51] Int. Cl.3 .............................................. G05D 11/13

[52] U.S. Cl. .......................................... 137/3; 137/10; 137/91; 137/101.21; 137/563; 366/137; 366/152

[58] Field of Search ............... 366/137, 152, 159, 181, 366/182; 137/91, 98, 101.21, 563, 3, 10; 106/89, 97; 73/218, 252

[56] References Cited

U.S. PATENT DOCUMENTS

| | | | |
|---|---|---|---|
| 2,885,154 | 5/1959 | Eastman et al. | 137/91 |
| 2,913,901 | 11/1959 | Moen | 73/218 |
| 3,161,203 | 12/1964 | Hathorn et al. | 137/91 |
| 3,195,551 | 7/1965 | Russell | 137/91 |
| 4,006,752 | 2/1977 | De Vale | 137/101.21 |
| 4,007,755 | 2/1977 | Lerner et al. | 137/101.21 |
| 4,265,266 | 5/1981 | Kierbow et al. | 366/152 |

FOREIGN PATENT DOCUMENTS

| | | | |
|---|---|---|---|
| 2046383 | 4/1972 | Fed. Rep. of Germany | 137/91 |
| 307300 | 6/1930 | United Kingdom . | |
| 707535 | 4/1954 | United Kingdom . | |
| 720919 | 12/1954 | United Kingdom . | |
| 925489 | 5/1963 | United Kingdom . | |
| 1208347 | 10/1970 | United Kingdom . | |
| 667957 | 6/1979 | U.S.S.R. | 137/101.21 |

*Primary Examiner*—H. Jay Spiegel

*Attorney, Agent, or Firm*—Cushman, Darby & Cushman

[57] ABSTRACT

Apparatus and method for producing a slurry. The apparatus includes a slurry reservoir, a closed circuit and a pump for circulating slurry from the reservoir through the closed circuit and back to the reservoir. Means are provided for introducing both particulate and liquid materials into the closed circuit for forming the slurry. A first control circuit provides a particulate flow rate signal indicating the rate of flow of particulate material into the closed circuit. A flow meter provides a liquid flow rate signal indicative of the actual flow rate of liquid material into the closed circuit. A density measuring and control circuit measures the density of slurry flowing within the closed circuit and provides a density signal indicative of the difference between the measured density of slurry and a desired desity based upon data inputted to the density measuring and control circuit. A ratio circuit, receiving the particulate flow rate signal and density signal generates a desired rate of flow signal indicative of a desired flow rate for the introduction of the liquid material into the closed circuit. This desired rate of flow is a function of desired slurry density, actual density and the particulate flow rate. A liquid control circuit receives the desired rate of flow signal from the ratio circuit and the liquid flow rate signal from the flow meter and generates a feedback signal for controlling the actual rate of flow of liquid material into the closed circuit to maintain precise control over the actual density of slurry in order to achieve the desired slurry density.

7 Claims, 2 Drawing Figures

SLURRY PRODUCING APPARATUS

This invention relates to slurry-producing apparatus.

According to the present invention there is provided a slurry producing apparatus comprising: a reservoir for containing a slurry; a closed circuit connected with the reservoir; pump means for circulating slurry from the reservoir through the closed circuit and back to the reservoir; means for supplying particulate material and liquid to the closed circuit to produce slurry therein; first measuring means for measuring the actual rate of flow of liquid to the closed circuit; second measuring means for measuring the actual density of slurry flowing in the closed circuit; and a liquid control circuit connected to receive signals from the first measuring means related to the said actual rate of flow of liquid and from means for generating a signal representing the required rate of flow of liquid in dependence on the rate of supply of particulate material, the desired density of the slurry and the actual density of the slurry circulating in the said closed circuit, and operative to control the flow of liquid to the closed circuit so that the actual density of slurry is maintained substantially equal to the desired density.

Preferably the said means for generating a signal representing the required rate of flow of liquid comprises a first circuit for providing a signal representing the required rate of flow of liquid in dependence on the desired density of slurry and the rate of supply of the particulate material, and a second circuit for causing the signal generated by the first circuit to be modified in dependence upon the difference between the actual density of the slurry and the desired density of the slurry.

In a preferred embodiment the said liquid control circuit is connected to receive the modified signal from said first circuit and to compare it with the signal related to the actual flow of liquid produced by the first measuring means and to control the flow of liquid in dependence upon the difference therebetween.

In the preferred embodiment the first measuring means is a turbine flow meter and the second measuring means is a radio-active density meter.

The apparatus may include a rotary valve for feeding said particulate material to the closed circuit, in which case the rate of supply of particulate material to the closed circuit is represented by a signal related to the speed of rotation of said rotary valve.

Figure 2:
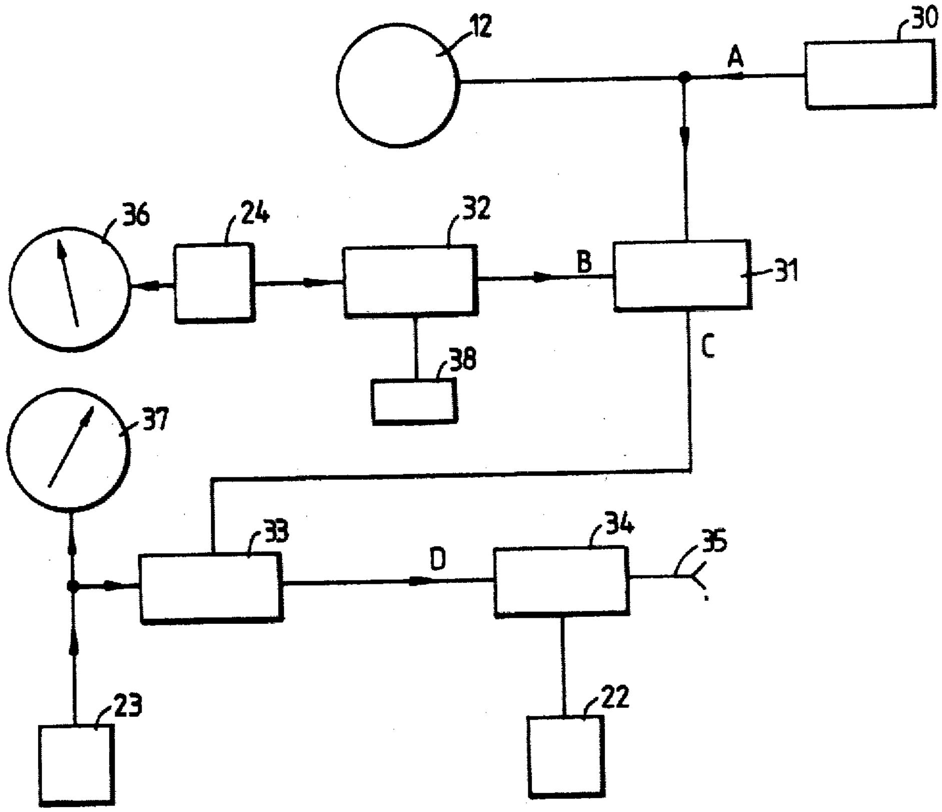

The invention is illustrated, merely by way of example, in the accompanying drawings, in which:

FIG. 1 illustrates schematically a slurry-producing apparatus according to the present invention; and FIG. 2 is a block diagram of a control circuit of the slurry-producing apparatus of FIG. 1.

Referring first to FIG. 1, a slurry-producing apparatus according to the present invention comprises a reservoir 10 for containing cement powder. Cement powder may be conveyed pneumatically into the reservoir 10 from a bulk carrier (not shown) in conventional manner. Connected to a discharge orifice 11 of the reservoir 10 is a vaned rotary feed valve 12. The rate of flow of cement powder passing through the valve 12 to a hopper 13 is a function of the speed of rotation of the valve.

A line 14 extends from the slurry reservoir 15 containing cement slurry to the suction side of a slurry pump 16. A line 17 extends from the discharge side of the pump to the reservoir 15 and a discharge orifice 18 of the hopper 13 communicates with the line 17. The line 14 and the line 17 thus form a closed circuit connected to the reservoir 15, the pump 16 circulating cement slurry from the reservoir 15 through this closed circuit and back to the reservoir. The orifice 18 and the adjacent part of the line 17 are arranged so that the cement powder entering the line 17 from the orifice 18 mixes with the cement slurry.

Upstream—in the sense of the direction of flow of the cement slurry in the line 17—of the orifice 18 is a water inlet 20 which feeds water to the line 17. The inlet 20 is connected to a line 21 having therein a variable pneumatically operated valve 22 and a turbine flow meter 23 for measuring the rate of flow of water in the line 21. Upstream of the inlet 20, the line 17 has a radio-active density meter 24 for producing an indication of the density of the cement slurry flowing in the line 17. The density meter is located in a bypass line 25 connected between the line 17 and the reservoir 15 (the connection to the reservoir 15 is not shown). Downstream of the density meter 24, there is a manually operable valve in the line 25 to maintain the pressure of cement slurry to the line 25 substantially constant. The reservoir 15 has an outlet 26 from which cement slurry is pumped to a point of use.

Referring now to FIG. 2, there is illustrated a control circuit of the slurry-producing apparatus of FIG. 1. A motor control circuit 30 produces a signal A which determines the speed of rotation of the valve 12 and which is indicative of the actual rate of flow of cement powder to the hopper 13. The signal A is fed to a ratio circuit 31 and is multiplied therein by a factor k, the product k.A representing a theoretical rate of flow of water necessary to produce a slurry of the desired density. The factor k is variable and may be determined from charts or tables.

The ratio circuit 31 also receives an input signal B from a density control circuit 32. The density control circuit 32 receives a signal representative of the actual density of the cement slurry in the line 17 from the density meter 24 and compares it with a desired density which is manually set therein. The signal B is, therefore, indicative of the difference between the actual density of the cement slurry and the desired density. The ratio circuit 31 produces an output signal C which is a function of the theoretical rate of flow of water necessary to produce a slurry of the desired density modified in dependence upon the difference between the actual density of the slurry and the desired density of the slurry, that is $$C = k.A + B$$

The signal C is fed to a water control circuit 33 to control its set point. The water control circuit 33 receives, from the flow meter 23, a signal indicative of the actual rate of flow of water in the line 21 and produces an output signal D indicative of the difference between the actual rate of flow of water and the desired rate of flow. The signal D is fed to a pneumatic control circuit 34 which controls the supply of pressurized air from a line 35 to the valve 22 thus regulating the flow of water in the line 21.

The actual density of the cement slurry is displayed by an indicator 36 which may, for example, be a pen recorder and the actual rate of flow of water is displayed by an indicator 37 which may be a meter. The density of the cement slurry leaving the reservoir 15 via the outlet 26 may be determined by a further radioactive density meter (not shown), the measurement made by this density meter also being displayed by the indicator 36.

The density control circuit 32 has a manual over-ride circuit 38 so that the level of the signal B can be determined manually and not in dependence upon the signal from the density meter 24.

If desired, the supply of pressurized air to the valve 22 may be controlled manually. This provides the slurry-producing apparatus with an over-ride so that it may be operated in a manual mode rather than in an automatic mode.

The control circuit of FIG. 2 operates as follows. The primary control is that of the speed of rotation of the valve 12. Thus the rate of flow of cement powder is not measured and is only controlled by the speed of rotation of the valve. The voltage of the signal A supplied to the ratio circuit 31 increases or decreases within minimum and maximum limits in line with the speed of rotation of valve 12. As stated above, the signal A is multiplied in the ratio circuit 31 by the factor k, the product k.A being the theoretical rate of flow of water necessary to produce a cement slurry of the required density. The water control circuit 33 maintains the rate of flow of water at the desired rate determined by the ratio circuit, by measuring the actual rate of flow of water by means of the flow meter 23, and comparing this with the desired rate of flow as determined by the signal C. If the actual rate of flow of water and the desired rate of flow of water are not identical, the signal D is produced to adjust the position of the valve 22 via the pneumatic control circuit 34.

Despite having set the speed of rotation of the valve 12 and the rate of flow of water to the theoretically correct proportions to produce a cement slurry of a desired density, there will be variations in the actual density of the cement slurry caused by variations in the bulk density of the cement powder, and by variations in the volumetric efficiency of the valve 12. To detect these variations, the actual density of the cement slurry measured by the density meter 24 is compared in the control circuit 32 with the desired density and the signal B produced if they are not equal. The signal B in the ratio circuit 31 modifies the theoretical rate of flow of water k.A so that the signal C is representative of the desired rate of flow of water necessary to produce the desired density of cement slurry.

The present invention has been described above in relation to a slurry-producing apparatus for producing a cement slurry from cement powder and water. A slurry-producing apparatus according to the present invention, however, may be used to produce a slurry from any particulate material and any liquid.

What is claimed is:

1. A slurry producing apparatus, comprising:

a reservoir for containing the slurry;

a closed circuit coupled to the reservoir;

a pump for circulating slurry from the reservoir through the closed circuit and back to the reservoir;

means for supplying particulate material to the closed circuit;

means for supplying liquid material to the closed circuit, the particulate and liquid material together forming the slurry;

means for generating a particulate flow rate signal indicative of the rate of flow of particulate material into the closed circuit;

a flowmeter for measuring the rate of flow of the liquid material into the closed circuit and generating an actual liquid flow rate signal indicative thereof;

a density meter for measuring the density of slurry circulating within the closed circuit and generating a density signal indicative thereof;

density control circuit means, responsive to the particulate flow rate and density signals and to externally supplied input data indicating a desired slurry density, for determining therefrom a desired rate of flow of the liquid material into the closed circuit and generating a desired liquid flow rate signal indicative thereof; and a liquid control circuit, responsive to the actual liquid flow rate and desired liquid flow rate signals for controlling the rate of flow of liquid material into the closed circuit to obtain a slurry density substantially equal to the desired density said density control circuit including means responsive to said density signal for altering the desired liquid flow rate signal whenever the liquid flow rate is not causing the desired slurry density to be established.

2. Apparatus according to claim 1 wherein the density control circuit means comprises:

a first circuit for generating a signal representing a required rate of flow of liquid material into the closed circuit as a function of desired slurry density; and a second circuit including said means responsive to said density signal, coupled to the first circuit, for causing the signal generated by the first circuit to be modified as a function of the difference between the density signal and the value of desired density in order to produce the desired liquid flow rate signal.

3. Apparatus according to claim 2 wherein the liquid control circuit compares the actual liquid flow rate signal with the desired liquid flow rate signal and controls liquid material supplying means as a function of the difference therebetween.

4. Apparatus according to claim 1 wherein the flowmeter comprises a turbine flow meter.

5. Apparatus according to claim 1 wherein the density meter comprises a radio-active density meter.

6. Apparatus according to claim 1 further including a rotary valve for controlling the feeding of particulate material into the closed circuit, the particulate flow rate signal representing the speed of rotation of the rotary valve.

7. A method for producing a slurry comprising a step of:

providing a slurry reservoir with a circulating closed circuit into which particulate and liquid materials can be added;

supplying particulate material at a predetermined rate and generating a particulate flow rate signal indicative thereof;

measuring the density of slurry within the closed circuit and generating a difference signal representing the difference between actual slurry density, as measured, and a desired slurry density;

computing a desired rate of flow for the introduction of liquid material into the closed circuit as a function of the particulate flow rate signal and said difference signal and generating a desired rate of flow signal indicative thereof;

measuring the actual rate of flow of liquid into the closed circuit;

comparing the actual rate of flow of liquid material with said desired rate of flow and generating a signal indicative of the difference therebetween;

controlling the rate of flow of liquid material into the closed circuit in accordance with the difference and altering the desired rate of flow signal responsive to said difference signal whenever the liquid material flow rate is not causing the desired slurry density to be established.

* * * * *